(12) United States Patent
Sakanaka et al.

(10) Patent No.: US 7,780,556 B2
(45) Date of Patent: Aug. 24, 2010

(54) BELT DRIVE SYSTEM

(75) Inventors: Hiroyuki Sakanaka, Kobe (JP); Mitsuhiko Takahashi, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 288 days.

(21) Appl. No.: 11/817,315

(22) PCT Filed: Mar. 6, 2006

(86) PCT No.: PCT/JP2006/304283

§ 371 (c)(1), (2), (4) Date: Aug. 28, 2007

(87) PCT Pub. No.: WO2006/095690

PCT Pub. Date: Sep. 14, 2006

(65) Prior Publication Data

US 2009/0036240 A1    Feb. 5, 2009

(30) Foreign Application Priority Data

Mar. 7, 2005   (JP)   ............... 2005-062637

(51) Int. Cl.
*F16H 55/56* (2006.01)
*F16H 55/36* (2006.01)
*F16G 1/04* (2006.01)

(52) U.S. Cl. .................. 474/8; 474/174; 474/268
(58) Field of Classification Search ............ 474/8, 474/18, 28, 166, 170, 174, 190, 268, 9
See application file for complete search history.

(56) References Cited

U.S. PATENT DOCUMENTS

| 2,187,188 | A | * | 1/1940 | Whitcomb | 474/42 |
| 2,212,194 | A | * | 8/1940 | Lewellen et al. | 474/31 |
| 2,253,774 | A | * | 8/1941 | Eppler | 474/169 |
| 2,279,816 | A | * | 4/1942 | Eppler | 29/892.2 |

(Continued)

FOREIGN PATENT DOCUMENTS

JP    10-122318 A    5/1998

(Continued)

OTHER PUBLICATIONS

International Search Report for PCT/JP2006/304283 mailed Apr. 4, 2006.

*Primary Examiner*—John Q Nguyen
*Assistant Examiner*—Henry Liu
(74) *Attorney, Agent, or Firm*—Roberts Mlotkowski Safran & Cole, P.C.; Thomas W. Cole

(57) ABSTRACT

A belt drive system including an assembly of a heavy-duty drive V-belt 5 and pulleys 2 and 4 reduces noise generating owing to belt travel while ensuring the durability of the pulleys 2 and 4. The surfaces of belt grooves 6 in the V-pulleys 2 and 4 are micro-blasted or burnished so that their surface roughness satisfies the relational expression $y \leq -0.9 \times tp + 100$, where tp is the load length rate at a given position of a roughness curve indicating the surface features of the groove surfaces in the V-pulleys 2 and 4 and y is the variable (the degree of height) indicating by percentage the ratio of the height from the lowest valley having a maximum depth to the given position to a maximum height Ry.

3 Claims, 10 Drawing Sheets

U.S. PATENT DOCUMENTS

| | | | |
|---|---|---|---|
| 2,516,829 A * | 7/1950 | Reeves | 474/45 |
| 2,806,379 A * | 9/1957 | Haracz | 474/191 |
| 3,225,614 A * | 12/1965 | Skinner et al. | 474/174 |
| 3,494,211 A * | 2/1970 | Thiery et al. | 474/10 |
| 4,075,902 A * | 2/1978 | Charchian et al. | 474/44 |
| 4,303,404 A * | 12/1981 | Moore | 474/242 |
| 4,525,159 A * | 6/1985 | Filderman et al. | 474/201 |
| 4,692,128 A * | 9/1987 | Sadler | 474/8 |
| 4,781,660 A * | 11/1988 | Amataka et al. | 474/174 |
| 4,790,799 A * | 12/1988 | Sadler | 474/268 |
| 4,838,842 A * | 6/1989 | Ohkata et al. | 474/192 |
| 4,905,361 A * | 3/1990 | Morishita et al. | 29/892 |
| 4,913,689 A * | 4/1990 | Morishita et al. | 474/170 |
| 4,947,533 A * | 8/1990 | Taniguchi et al. | 29/894 |
| 5,098,346 A * | 3/1992 | Redmond | 474/161 |
| 5,374,221 A * | 12/1994 | Casada | 474/29 |
| 5,800,298 A * | 9/1998 | Kanehara et al. | 474/8 |
| 5,967,925 A * | 10/1999 | Meckstroth | 474/175 |
| 6,068,564 A * | 5/2000 | Takahara | 474/12 |
| 6,086,499 A * | 7/2000 | Brandsma | 474/201 |
| 6,123,634 A * | 9/2000 | Faust et al. | 474/8 |
| 6,254,503 B1 * | 7/2001 | Chiba et al. | 474/8 |
| 6,537,166 B1 * | 3/2003 | Adriaenssens et al. | 474/8 |
| 6,648,781 B1 * | 11/2003 | Fischer et al. | 474/8 |
| 6,997,836 B2 * | 2/2006 | Kanehara et al. | 474/242 |
| 7,131,921 B2 * | 11/2006 | Walter et al. | 474/8 |
| 7,276,002 B2 * | 10/2007 | Wang et al. | 474/8 |
| 2001/0053727 A1 * | 12/2001 | Nakashima et al. | 474/242 |
| 2002/0119851 A1 * | 8/2002 | Lukschandel | 474/177 |
| 2003/0200846 A1 * | 10/2003 | Chiba et al. | 82/104 |
| 2004/0067808 A1 * | 4/2004 | Kanehara et al. | 474/242 |
| 2005/0090340 A1 * | 4/2005 | Wang et al. | 474/8 |
| 2005/0221938 A1 * | 10/2005 | Yoshida et al. | 474/242 |
| 2007/0140727 A1 * | 6/2007 | Miyamoto et al. | 399/101 |
| 2008/0229581 A1 * | 9/2008 | Ito et al. | 29/892 |

FOREIGN PATENT DOCUMENTS

| | | | |
|---|---|---|---|
| JP | 2001-65651 A | | 3/2001 |
| JP | 2001343056 A | * | 12/2001 |
| JP | 2002-70992 A | | 3/2002 |
| JP | 2002-213580 A | | 7/2002 |
| JP | 2002213580 A | * | 7/2002 |
| JP | 2003-202020 A | | 7/2003 |
| JP | 2004-190829 A | | 7/2004 |
| JP | 2004-293635 A | | 10/2004 |

* cited by examiner

FIG. 11

| Items | Conditions |
|---|---|
| Rotation number of drive shaft | 5285±60rpm |
| Drive pulley pitch diameter | φ126.4±0.1mm |
| Driven pulley pitch diameter | φ70.8±0.1mm |
| Drive shaft torque | 63.4±0.5N·m |
| Load on shaft (SW2) | 1764±49N |
| Quantity of heat input to BOX | Temperature : 107±3°C |
|  | Wind velocity : 20±3m/sec |

BELT DRIVE SYSTEM

TECHNICAL FIELD

This invention relates to belt drive systems with a drive V-belt and particularly relates to the field of technology of reducing noise generating owing to belt travel.

BACKGROUND ART

Belt drive systems transmit power via a V-belt by wrapping the V-belt around a V-pulley and frictionally engaging them. There is known a V-belt for such a belt drive system that has a structure in which a large number of blocks are fitted on a pair of tension members. When the V-belt has such a structure, a problem arises that noise during belt travel is relatively large. Specifically, when the V-belt moves into and away from the V-pulley, each block of the V-belt comes into contact with the surface of the V-pulley to produce an impact sound. On the other hand, when each block disengages from the V-pulley, it produces a sticking sound.

Known structures for reducing such noise during belt travel include a structure in which the surface roughness of the groove surface of the V-pulley is adjusted to a predetermined arithmetic mean roughness Ra, as disclosed in Patent Document 1, and a structure in which a shell member is disposed on the pulley groove surface, as disclosed in Patent Document 2.

Specifically, Patent Document 1 discloses a technique of adjusting the surface roughness of the groove surface of the V-pulley to a predetermined arithmetic mean roughness Ra to reduce energy generating by interference between the V-belt and the V-pulley in contact with each other, thereby reducing noise during belt travel.

Patent Document 2 discloses a technique in which a sheet-like shell member formed in a substantially lambdoid cross section is disposed to cover the entire groove surface of the V-pulley and a buffer material or liquid placed between the shell member and the groove surface of the V-pulley absorbs energy generating during contact of the V-belt with the V-pulley to reduce noise during belt travel.

Patent Document 1: Published Japanese Patent Application No. 2002-70992

Patent Document 2: Published Japanese Patent Application No. H10-122318

DISCLOSURE OF THE INVENTION

Problems to Be Solved by the Invention

However, when the surface roughness of the groove surface of the V-pulley is evaluated in terms of arithmetic mean roughness Ra as in Patent Document 1, this evaluation reflects the heights of microscopic hills on the groove surface but does not accurately reflect the shapes of the hills. If the hills are as a whole not so high (not so steep) even when the groove surface has substantially the same arithmetic mean roughness as desired, the microscopic contact area between the V-belt and the V-pulley becomes large. This increases the frictional resistance of the V-belt upon contact with the V-pulley and thereby increases the magnitude of generated noise.

When the shell member is disposed on the groove surface of the V-pulley as in Patent Document 2, the shell member may be damaged by frictional contact with the belt. Therefore, this structure is not preferable in view of durability of the V-pulley.

The present invention has been made in view of the foregoing points and, therefore, its object is to provide a belt drive system including a V-pulley and a V-belt, the belt drive system being capable of effectively reducing noise generating owing to belt travel while ensuring the durability of the V-pulley.

Means to Solve the Problems

To attain the above object, according to a belt drive system according to the present invention, the surface roughness of the groove surface of the V-pulley is evaluated in terms of load length rate tp considering not only the heights of the hills but also the widths thereof and the surface roughness of the groove surface is adjusted so that the load length rate tp and the degree of height y indicating the height from the lowest valley of the roughness curve satisfy a particular relational expression.

Specifically, a first aspect of the invention is directed to a belt drive system including: a drive V-belt having a large number of blocks engagingly fixed in mating relation to a pair of tension members; and a V-pulley formed with a groove for wrapping the V-belt therearound, the belt drive system being configured to transmit power by contact of side faces of the V-belt with the surface of the groove in the V-pulley.

Furthermore, the surface of the groove in the V-pulley is configured so that the following relational expression holds between tp and y of a roughness curve indicating the surface features of the surface of the groove in the V-pulley $$y \leq -0.9 \times tp + 100$$

where tp is the load length rate at a given position of the roughness curve in a direction of height and y is the degree of height indicating by percentage the ratio of the height from the lowest valley having a maximum depth to the given position to a maximum height Ry.

With this configuration, the surface features of the groove in the V-pulley are determined based on an index of the load length rate tp (JIS B0601). Therefore, not only the heights of hills but also the widths thereof are considered as the surface conditions of the belt groove surface, unlike the case where only the heights of hills are considered when the index is the arithmetic mean roughness Ra. Note here that since it is generally believed that the side faces of the V-belt in a belt drive system are pressed against the groove surface of the V-pulley and hills on the groove surface are thereby microscopically squashed and deformed, the microscopic contact area between the V-belt and the V-pulley in contact with each other is believed to correspond to the widths of the hills on the groove surface.

Furthermore, the above expression indicates the relation between the degree of height y indicating the height from the lowest valley of the roughness curve for the groove surface of the V-pulley and the load length rate tp at the position. If the surface features satisfy the relation of the above expression, the hills have relatively steep configurations and, regardless of load conditions of the V-belt, the microscopic contact area between the V-belt and the V-pulley becomes smaller than that when the surface features do not satisfy the relation of the above expression.

Therefore, when the groove surface is configured so that the surface roughness of the groove surface in the V-pulley satisfies the relation of the above expression considering the contact area between the V-belt and the groove surface of the V-pulley, the microscopic contact area between the V-belt and the V-pulley in contact with each other can be smaller than that when the surface features do not satisfy the relation of the above expression. Thus, noise generating during belt travel can be surely reduced.

In the above configuration, the surface of the groove in the V-pulley is preferably blasted with abrasive grains having a diameter of approximately 3 µm to approximately 40 µm (a second aspect of the invention). Alternatively, the surface of the groove in the V-pulley may be burnished with a tool whose tip is formed to have a curvature radius of approximately 1.5 mm to approximately 3.0 mm (a third aspect of the invention). In these manners, the groove surface of the V-pulley has a surface roughness satisfying the relation of the above expression, thereby providing the functions of the first aspect of the invention.

Effects of the Invention

According to the belt drive system of the first aspect of the invention, the load length rate tp is used as an index indicating the surface roughness of the groove surface of the V-pulley and the groove surface is configured to satisfy a particular relation. Therefore, the microscopic contact area between the groove surface of the V-pulley and the side faces of the V-belt can be small, thereby effectively reducing noise generating during belt travel.

According to the belt drive systems of the second and third aspects of the invention, the groove surface of the V-pulley is blasted or burnished under specified conditions. Therefore, the configuration of the first aspect of the invention can be implemented, thereby reducing noise generating during belt travel.

BRIEF DESCRIPTION OF DRAWINGS

FIG. 11 is a table showing conditions of the durability test.

Figure 1A:
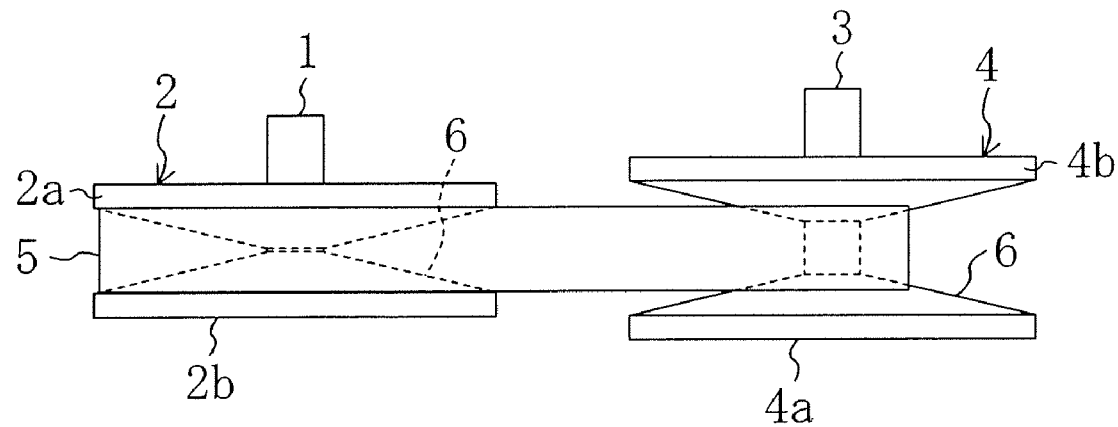
FIG. 1 shows a high-speed mode of a belt drive system according to an embodiment of the present invention, wherein 1A is a top view and 1B is a front view.

EXPLANATION OF REFERENCE NUMERALS 1 drive rotational shaft
2 drive pulley (V-pulley)
3 driven rotational shaft
4 driven pulley (V-pulley)
5 heavy-duty drive V-belt (drive V-belt)
6 belt groove (groove)
7 block
8 tension member

BEST MODE FOR CARRYING OUT THE INVENTION

Hereinafter, an embodiment of the present invention will be described with reference to the drawings. The description of the following preferred embodiment is merely illustrative in nature and is not intended to limit the scope, applications and use of the invention.

Figure 1B:
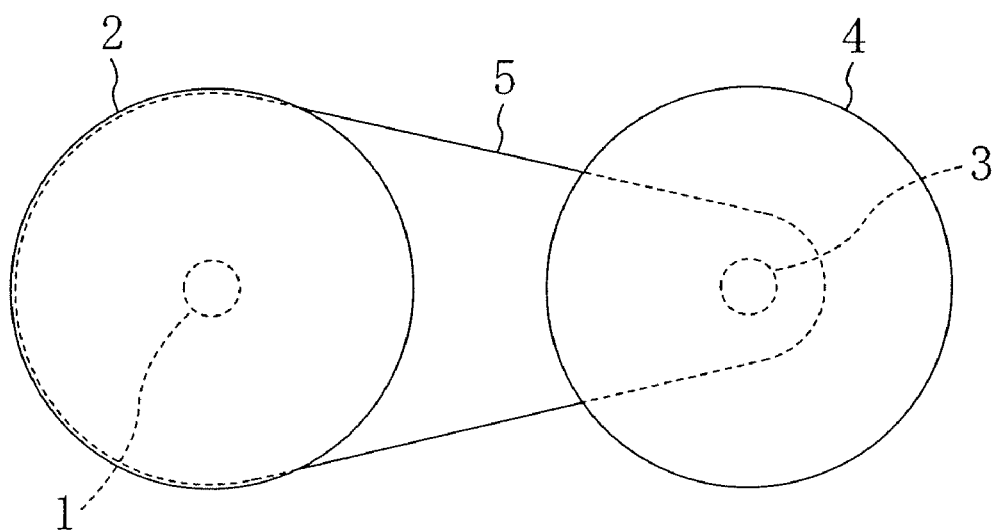
Figure 2A:
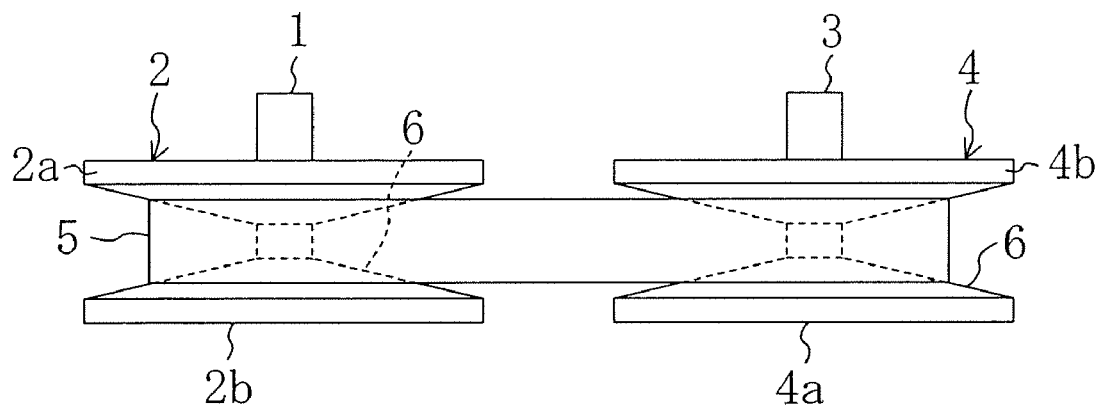
FIG. 2 is a corresponding view of FIG. 1 showing a mid-speed mode of the belt drive system.
Figure 2B:
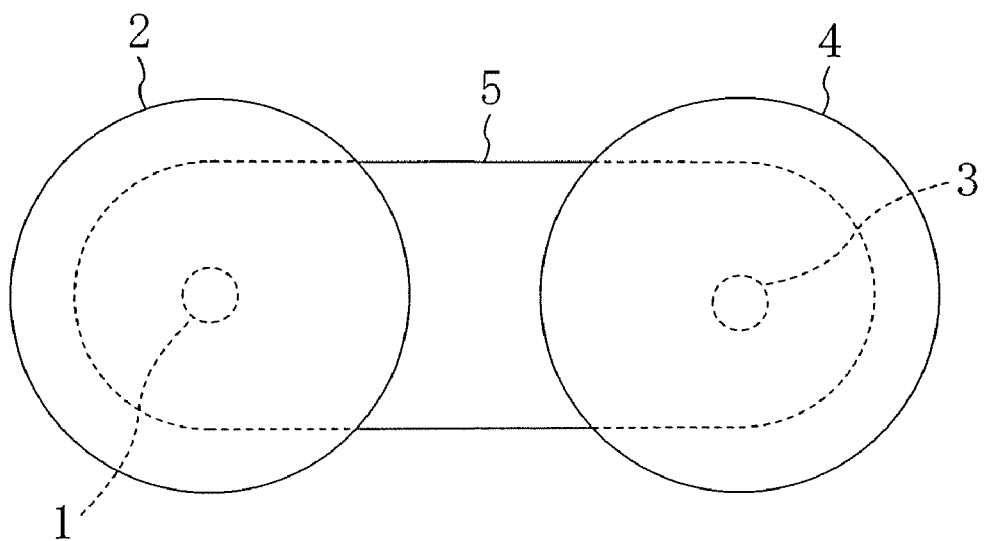
Figure 3A:
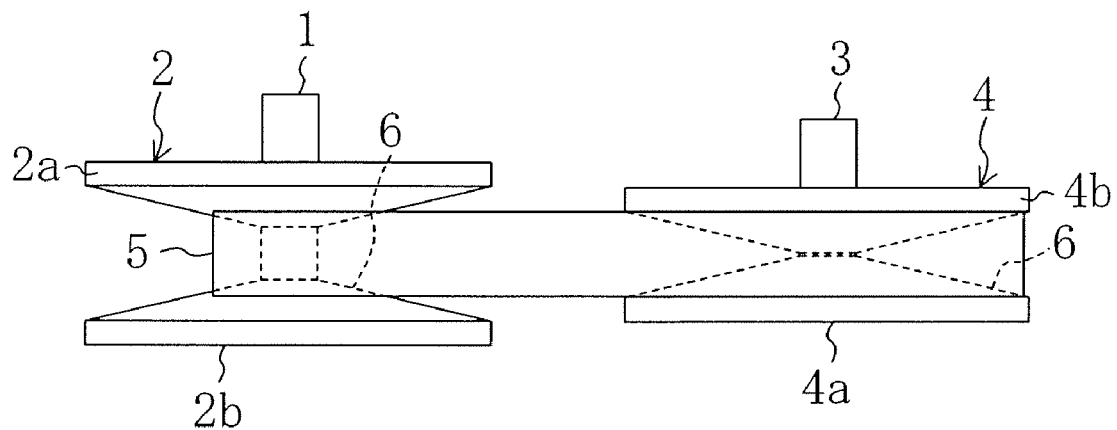
FIG. 3 is a corresponding view of FIG. 1 showing a low-speed mode of the belt drive system.
Figure 3B:
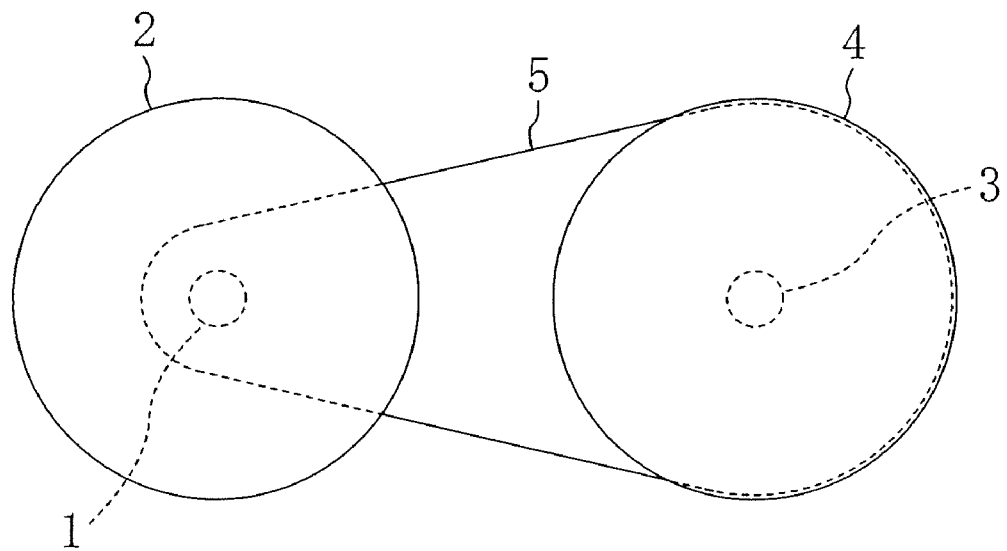

FIGS. 1 to 3 show a belt drive system according to an embodiment of the present invention, wherein reference numeral 1 denotes a drive rotational shaft and reference numeral 3 denotes a driven rotational shaft. Both the rotational shafts 1 and 3 are disposed in parallel to each other.

Disposed on the drive rotational shaft 1 is a drive pulley 2 (V-pulley) formed of a variable speed pulley. The drive pulley 2 is composed of a flange-shaped stationary sheave 2a fixed on the drive rotational shaft 1 for unitary rotation and against sliding thereon and a flange-shaped movable sheave 2b supported slidably on the drive rotational shaft 1 for unitary rotation to face the stationary sheave 2a. A belt groove 6 (groove) is defined between both the sheaves 2a and 2b.

Disposed on the driven rotational shaft 3 is a driven pulley 4 (V-pulley) formed of a variable speed pulley having the same diameter as the drive pulley 2. The driven pulley 4 has the same structure as the drive pulley 2 and is composed of a flange-shaped stationary sheave 4a fixed on the driven rotational shaft 3 for unitary rotation and against sliding thereon and a flange-shaped movable sheave 4b supported slidably on the driven rotational shaft 3 for unitary rotation to face the stationary sheave 4a in an opposite facing relation to the facing relation of the movable sheave 2b of the drive pulley 2 with the stationary sheave 2a. A belt groove 6 (groove) is defined between both the sheaves 4a and 4b.

Figure 4:
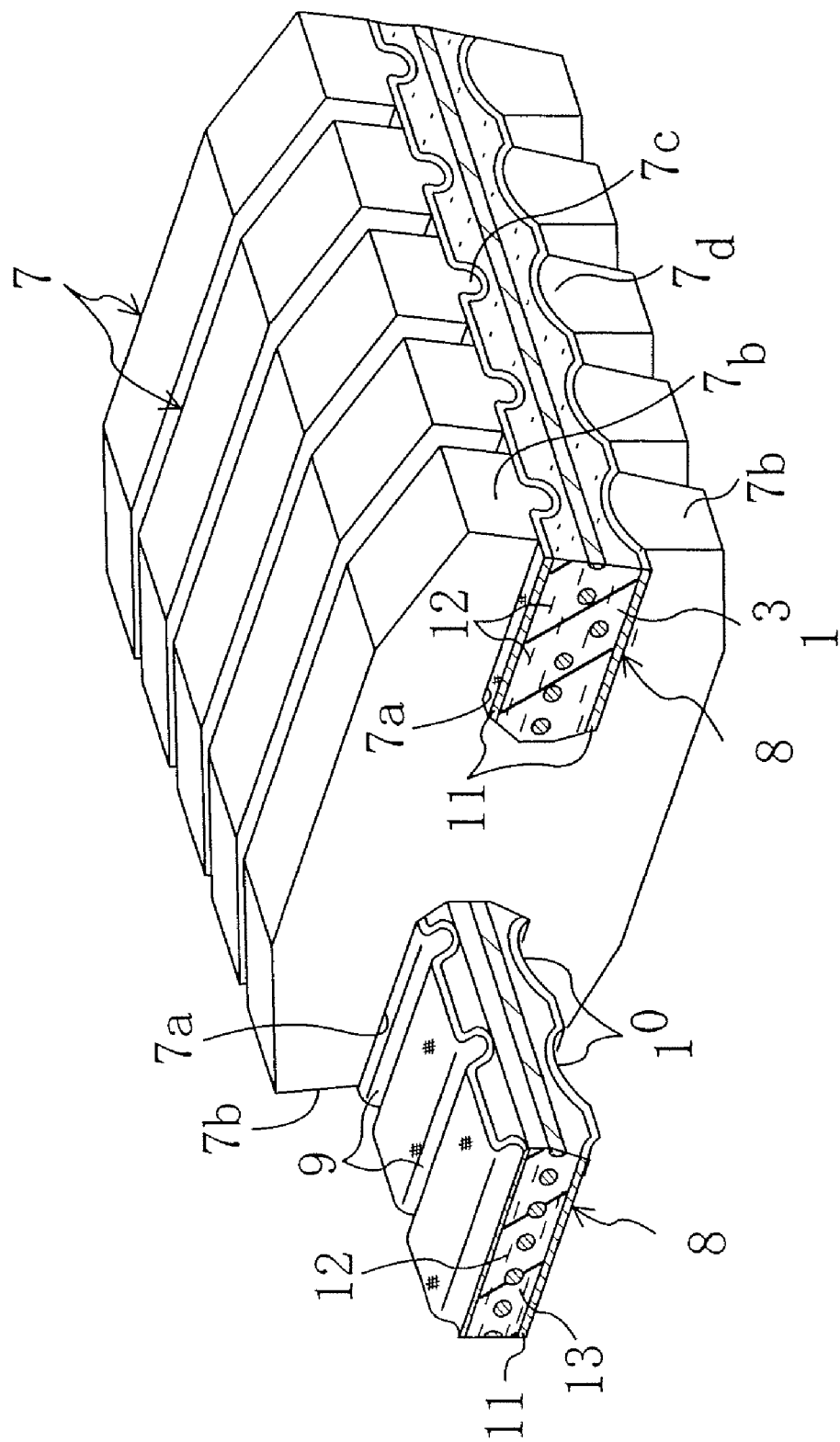
FIG. 4 is a perspective view of a heavy-duty drive V-belt.

A heavy-duty drive V-belt 5 extends between the belt grooves 6 and 6 of the drive pulley 2 and the driven pulley 4. The V-belt 5, as shown in FIG. 4, is composed of a pair of right and left endless tension members 8 and 8 and a large number of blocks 7, 7, . . . engagingly fixed in series to the tension members 8 and 8.

Each tension member 8 is formed by embedding a high-strength, high-modulus-of-elasticity cord, such as aramid fibers (braid), in a shape-retaining rubber layer 13 made of hard rubber so as to be spirally disposed therein. The top surface of each tension member 8 has channel-shaped upper depressions 9, 9, . . . formed at a regular pitch (e.g., a pitch of approximately 3.0 mm) to extend in the widthwise direction of the belt. On the other hand, the bottom surface of each tension member 8 has lower depressions 10, 10, . . . formed at a regular pitch in association with the upper depressions 9, 9, . . . to extend in the widthwise direction of the belt. Furthermore, the top and bottom surfaces of the tension member 8 are covered with fabrics 11 and 11 adhered integrally thereto for the purpose of preventing the production of cracks or enhancing the wear resistance.

The hard rubber constituting the shape-retaining rubber layer 13 is made of, for example, zinc methacrylate-reinforced hydrogenated NBR rubber and is formed to have an excellent heat resistance and difficulties in permanent deformation by mixing short organic fibers 12, 12, . . . into the entire rubber to further reinforce it. The hard rubber needs to have a rubber hardness larger than 75 when measured by the JIS-C type hardness tester.

Each block 7 has cutaway-shaped fitting sections 7a and 7a formed in the right and left sides thereof in the belt widthwise direction to allow the tension members 8 and 8 to be removably fitted therein from widthwise. Portions of the right and left side faces of each block 7 other than the fitting sections 7a and 7a constitute contact sections 7b and 7b capable of coming into contact with the belt grooves 6 and 6 of the drive and driven pulleys 2 and 4. The belt angle formed between the right and left contact sections 7b and 7b of each block 7 is set at the same angle of the belt groove 6 of each of the pulleys 2 and 4. Furthermore, the tension members 8 and 8 are press fitted into the associated fitting sections 7a and 7a of individual blocks 7, whereby the blocks 7, 7, ... are fixed in series in the belt lengthwise direction to the tension members 8 and 8.

Specifically, the top wall surface of each fitting section 7a in each block 7 has an upper bump 7c formed of a rib serving as an upper mating part mating with the associated upper depression 9 in the top surface of the associated tension member 8, while the bottom wall surface of the fitting section 7a has a lower bump 7d formed of a rib serving as a lower mating part mating with the associated lower depression 10 in the bottom surface of the associated tension member 8. The paired upper and lower bumps 7c and 7d are formed in parallel with each other. The paired upper and lower bumps 7c and 7d of individual blocks 7 are mated with the associated upper and lower depressions 9 and 10 of individual tension members 8, whereby the blocks 7, 7, ... are engagingly fixed by press fit to the tension members 8 and 8 to align in the belt lengthwise direction. In this engaged relation, the outside surface of each tension member 8 and the contact section 7b forming the side face of each block 7 are brought into contact with the belt grooves 6 of the pulleys 2 and 4 and the mating of the upper and lower bumps 7c and 7d of individual blocks 7 with the upper and lower depressions 9 and 10 of each tension member 8 allows power transmission.

Each block 7 is made of a hard resin material, such as phenol resin, and includes a reinforcing member (not shown) made as of a light-weight aluminium alloy and embedded therein to lie substantially in the middle of the block 7. The reinforcing member is embedded in the hard resin at least at the upper and lower bumps 7c and 7d (mating parts with the tension member 8) and the contact sections 7b and 7b on the right and left side faces and, therefore, is not exposed from these surfaces of the block 7 (i.e., these parts of the block 7 are made of hard resin). However, the reinforcing member may be exposed from the block 7 at the other parts thereof.

The belt drive system is configured to change the diameters of the belt portions wrapped around the pulleys 2 and 4 by individually moving the movable sheaves 2b and 4b of the pulleys 2 and 4 towards or away from the stationary sheaves 2a and 4a. Specifically, in entering a high-speed mode shown in FIG. 1, the movable sheave 2b of the drive pulley 2 is moved towards the stationary sheave 2a while the movable sheave 4b of the driven pulley 4 is moved away from the stationary sheave 4a. Thus, the diameter of the belt portion wrapped around the drive pulley 2 becomes larger than that of the belt portion wrapped around the driven pulley 4, whereby the belt drive system falls into a high-speed mode in which the rotation of the drive rotational shaft 1 is transmitted to the driven rotational shaft 3 with its speed increased. On the other hand, in entering a low-speed mode shown in FIG. 3, the movable sheave 2b of the drive pulley 2 is moved away from the stationary sheave 2a while the movable sheave 4b of the driven pulley 4 is moved towards the stationary sheave 4a. Thus, the diameter of the belt portion wrapped around the drive pulley 2 becomes smaller than that of the belt portion wrapped around the driven pulley 4, whereby the belt drive system falls into a low-speed mode in which the rotation of the drive rotational shaft 1 is transmitted to the driven rotational shaft 3 with its speed decreased. In a mid-speed mode shown in FIG. 2, the belt drive system is in an intermediate state between the high-speed mode and the low-speed mode, wherein the belt portions wrapped around the drive and driven pulleys 2 and 4 have substantially the same diameter.

Furthermore, the belt drive system according to this embodiment has the following feature as one of features of the present invention. The groove surface of the belt groove 6 of each of the variable speed pulleys 2 and 4, which is capable of contact with the side faces of the belt 5, has a uniform surface roughness. The groove surface is configured so that the relation of the after-mentioned expression (1) holds between tp and y of the roughness curve (JIS B0601) shown as an example in FIG. 5, where tp is the load length rate (%) indicating the percentage of hills at a given position of the roughness curve in a direction of height and y is the degree of height indicating by percentage the ratio of the height a from a lowest valley line v (the line passing through the lowest valley having a maximum depth and parallel with the after-mentioned mean line m) to the given position to a maximum height Ry. Note that in this embodiment the given position means an arbitrary position of the roughness curve in the direction of height.

$$y \leq -0.9 \times tp + 100 \tag{1}$$

Figure 5:
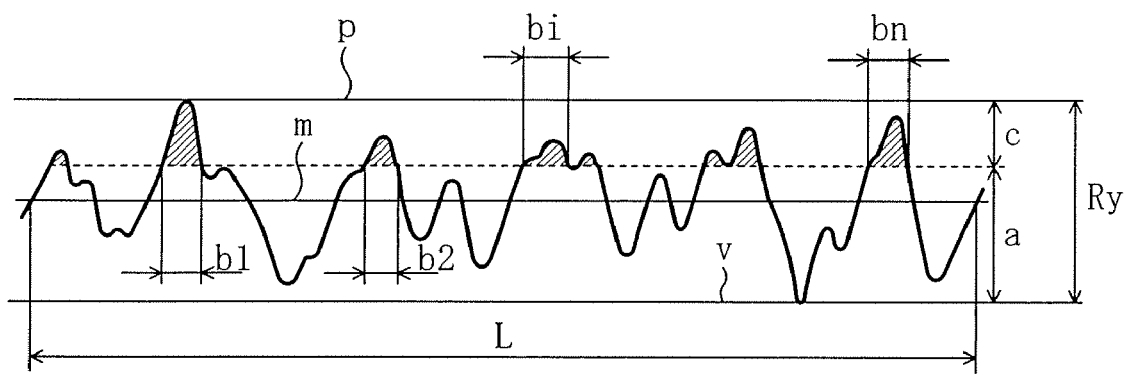
FIG. 5 is a graph illustrating an example of a roughness curve.

Here, the degree of height y is expressed by $a/Ry \times 100(\%)$ and the load length rate tp (JIS B0601) is specifically obtained as follows. First, as shown in FIG. 5, data of reference length L is extracted from the roughness curve. Then, the extracted part of the roughness curve is cut at given cutting levels c (arbitrary positions in the direction of height corresponding to degrees of height y as considered with reference to the height from the lowest valley line v) which are parallel to the highest peak line p (the line passing through the highest peak having a maximum height and parallel with the mean line m). Then, as shown in the following equation (2), the ratio of the sum of cut lengths (load length $\eta p$) obtained for each cutting level c to the reference length L is expressed by percentage, from which is derived the load length rate tp in the cutting level c.

$$tp = \eta p/L \times 100 \tag{2}$$

In this equation (2), $\eta p$ is expressed by $(b1+b2+ \ldots +bn)$ where each of b1, b2, ..., bn indicates a cut length.

Thereafter, in order that the surface roughness of the groove surface of the belt groove 6 in each of the variable speed pulleys 2 and 4 satisfies the relation of the above expression (1), the surfaces of the variable speed pulleys 2 and 4 are ground with a cutting machine tool, such as an MC or a milling machine, and the groove surfaces of the belt grooves 6 are micro-blasted (blasted) or burnished.

The micro-blasting is carried out by hitting fine abrasive grains of #400 to #3000 (with a diameter of 3 to 40 μm) on the groove surfaces of the variable speed pulleys 2 and 4 at high speed by compressed air, whereby the surface layer of each groove surface can be removed and the groove surface can be finished to a desired surface roughness. The burnishing is carried out by pushing a tool having a tip formed in a curvature radius of 1.5 to 3.0 mm against the groove surface of each pulley and putting pressure on the groove surface to rob it and thereby make it flat, whereby the groove surface can be finished to a desired surface roughness without removing the surface layer. In view of workability and productivity, a preferable surface finishing to be applied to the groove surfaces is micro-blasting.

Figure 6:
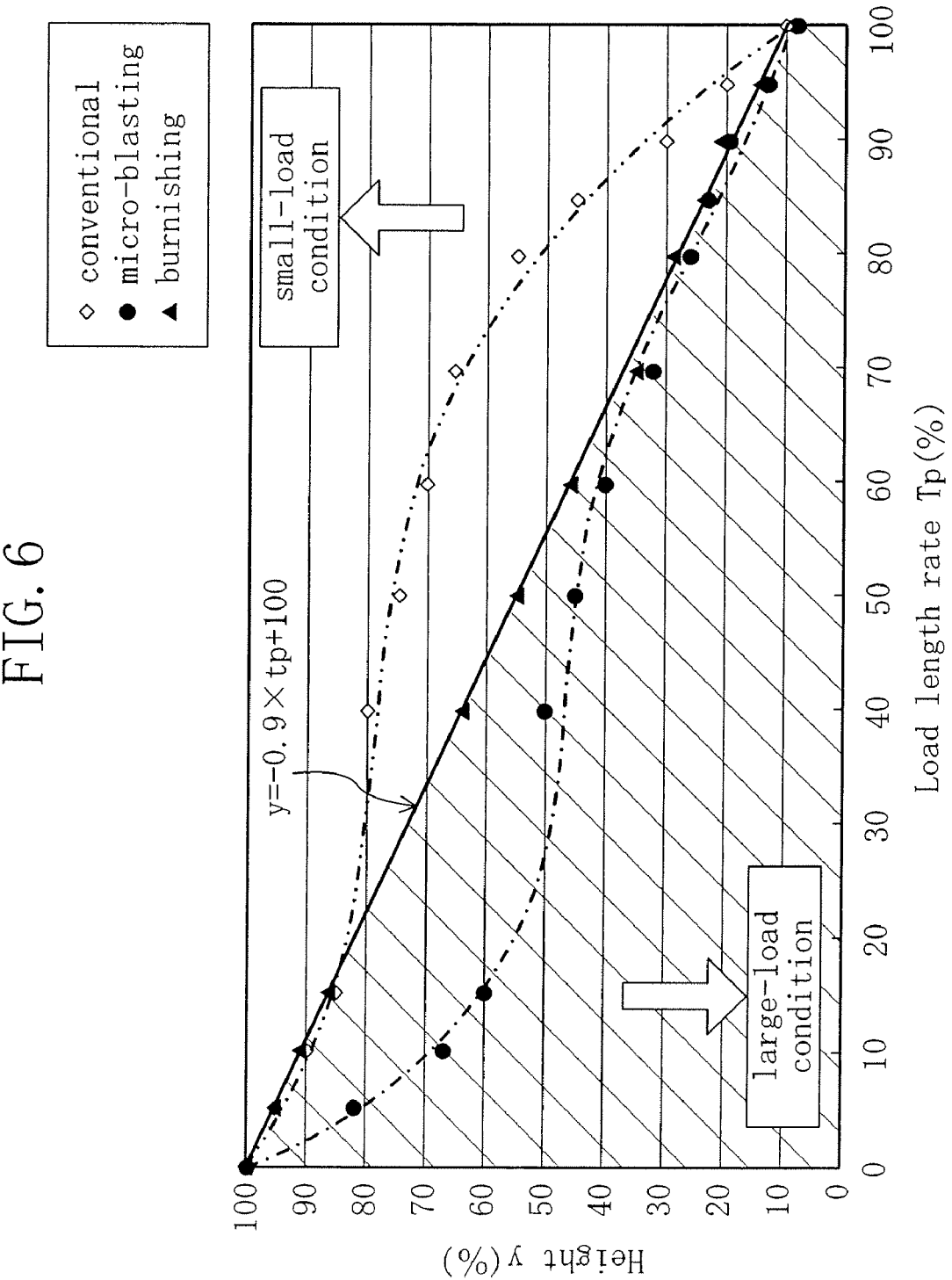
FIG. 6 is a graph showing the relation between load length rate and degree of height for groove surfaces finished in different ways.

FIG. 6 shows surface conditions of the belt groove 6 where the groove surface is micro-blasted or burnished as described above. In FIG. 6, the load length rate tp and the degree of height y are laid off as abscissas and ordinates, respectively, and the load length rate tp is plotted against degrees of height y indicating arbitrary positions in the direction of height (corresponding to individual cutting levels c as described above, 13 positions in this embodiment). If the groove surface of the belt groove 6 has a large number of steep hills, the load length rate tp at large degrees of height y becomes relatively small. On the other hand, if the hills on the groove surface of the belt groove 6 are not steep but are entirely high, the load length rate tp at large degrees of height y becomes relatively large.

As can be seen from FIG. 6, when the groove surface of the belt groove 6 is micro-blasted or burnished, the shapes of the hills on the surface features are formed to satisfy the relation of the above-mentioned expression (1) (corresponding to the shaded area in FIG. 6). However, if the groove surface is subjected to a conventional surface finishing (ground with an MC or a milling machine and then subjected to plating, such as electroless nickel plating for anti-rust and anti-corrosion), the shapes of the hills on the surface features cannot satisfy the relation of the above-described expression (1).

When, thus, the shapes of fine hills on the surface of the belt groove 6 are adjusted to satisfy the above expression (1), the microscopic contact area between the V-belt 5 and the belt grooves 6 and 6 of the pulleys 2 and 4 can also be controlled. Specifically, upon contact of the V-belt 5 with the groove surfaces of the belt grooves 6 and 6 of the pulleys 2 and 4, the peaks of the fine hills and their neighboring parts on the groove surfaces of the belt grooves 6 and 6 are microscopically squashed and slightly deformed according to the load from the V-belt 5. When the shapes of the hills (particularly the widths thereof) are controlled, the microscopic contact area between the V-belt 5 and the belt groove 6 can be controlled.

More specifically, if the load acting on the V-belt 5 changes, for example, to a large load, the fine hills on the groove surfaces of the belt grooves 6 and 6 of the pulleys 2 and 4 are largely squashed and deformed. Therefore, as seen from FIG. 6, the V-belt 5 comes into contact with the pulleys 2 and 4 at low heights y (indicated in the unfilled downward arrow in FIG. 6). However, when the shapes of the hills are controlled as described above, the microscopic contact area between the V-belt 5 and the pulleys 2 and 4 can be smaller than the case where the groove surfaces are finished by the conventional surface finishing method, thereby reducing the frictional resistance between the V-belt 5 and the pulleys 2 and 4.

In this manner, as a means for reducing energy upon contact between the heavy-duty drive V-belt 5 and the pulleys 2 and 4, the surface roughness on the groove surface of each of the belt grooves 6 and 6 of the pulleys 2 and 4 is set to satisfy the relation of the above expression (1). Therefore, the microscopic contact area between each block 7 of the V-belt 5 and the groove surfaces of the belt grooves 6 and 6 of the pulleys 2 and 4 can be made small to reduce the frictional resistance between them. As a result, energy generating during interference of the belt 5 with the pulleys 2 and 4, which is a cause of noise during belt travel, can be reduced and the noise during belt travel can be thereby reduced.

In this embodiment, any arbitrary heightwise position of the roughness curve for the belt groove surfaces of the pulleys 2 and 4 is assumed as a given position and the shapes of the fine hills are adjusted to satisfy the relation of the above expression (1) at all the heightwise positions. However, it will be sufficient if the shapes of the fine hills on the belt groove surface satisfy the relation of the above expression (1) at the heightwise position when the fine hills are squashed and deformed by load acting on the belt 5 and the microscopic contact area thereby becomes relatively small. Therefore, the shapes of the fine hills may be adjusted to satisfy the relation of the above expression (1) within a specified range corresponding to the range of variations of the load acting on the belt 5. In this case, the given position means any arbitrary position within the specified range.

Although in this embodiment a belt drive system including variable speed pulleys each composed of stationary and movable sheaves is used as a belt drive system according to the present invention, it goes without saying that the present invention is applicable to a belt drive system including a pulley composed of a pair of stationary sheaves and formed of a constant-speed pulley in which the diameter of the belt portion wrapped around the pulley is fixed.

—Comparison Verification—

Figure 7A:
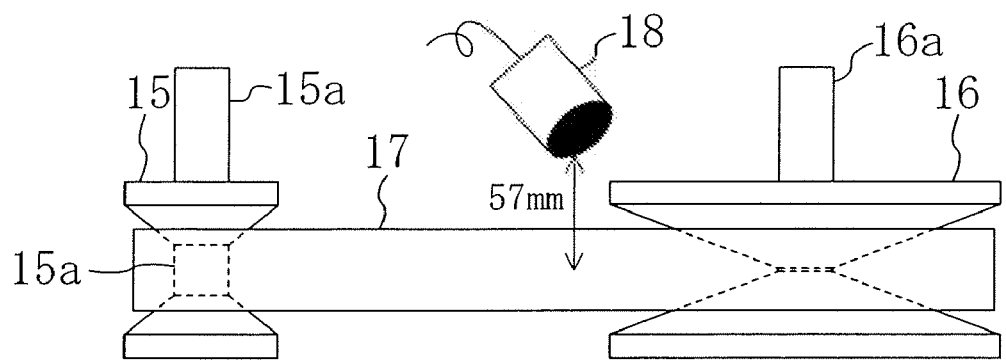
FIG. 7 shows a schematic structure of a noise tester, wherein 7A is a top view and 7B is a front view.

Next, a verification test was carried out for verifying the effects when the pulley groove surface was micro-blasted or burnished so that the surface roughness of the groove surface satisfies the relation of the above expression (1). FIG. 7 schematically shows a noise tester used in this example. The noise tester shown in FIG. 7 includes a drive pulley 16 of 151.0 mm pitch diameter (diameter of the belt portion wrapped therearound) carried on a drive rotational shaft 16a and a driven pulley 15 of 61.5 mm pitch diameter carried on a driven rotational shaft 15a. Both the pulleys 15 and 16 are placed with a specified center distance therebetween. A heavy-duty drive V-belt 17 as described above (see FIG. 4) is wrapped between both the pulleys 15 and 16. Both the pulleys 15 and 16 were rotated with a set weight SW1 (each of 980N, 1960N, 2940N and 3920N) applied on the driven pulley 15 in the direction of arrow in FIG. 7.

Used as the V-belt 17 was one having a belt length of 612 mm, a belt angle of 26°, a belt pitch width of 25 mm, a block pitch of 3 mm and a block thickness of 2.95 mm.

Figure 7B:
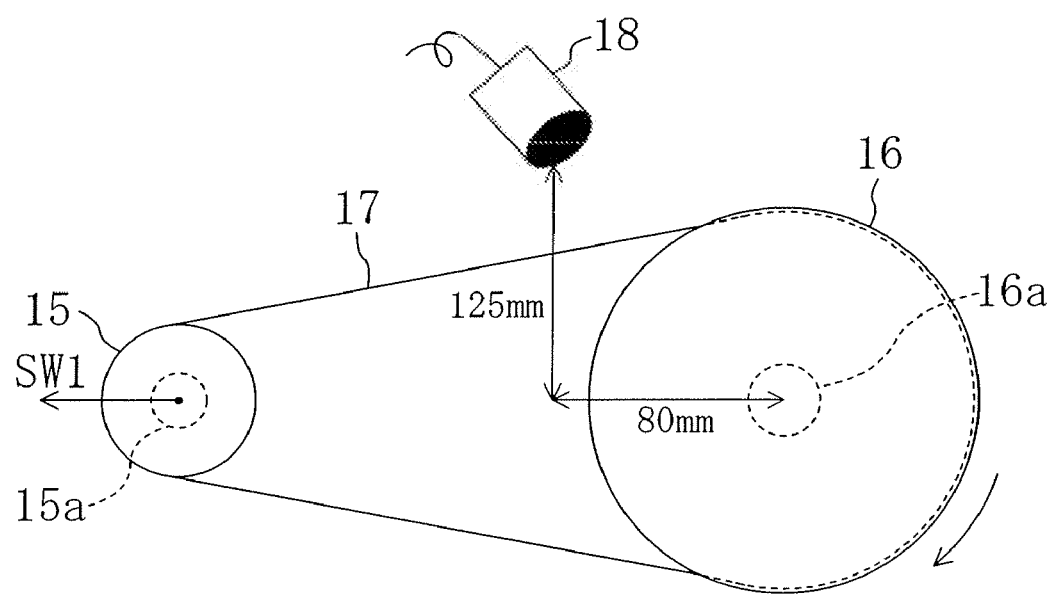

Furthermore, as shown in FIG. 7B, a microphone 18 is disposed as a noise measuring means at a position 80 mm leftward (on the driven rotational shaft 15a side) apart from the axis of the drive rotational shaft 16a and 125 mm upward and 57 mm backward (upward in FIG. 7A) from the line connecting the axes of the drive rotational shaft 16a and the driven rotational shaft 15a).

Figure 8:
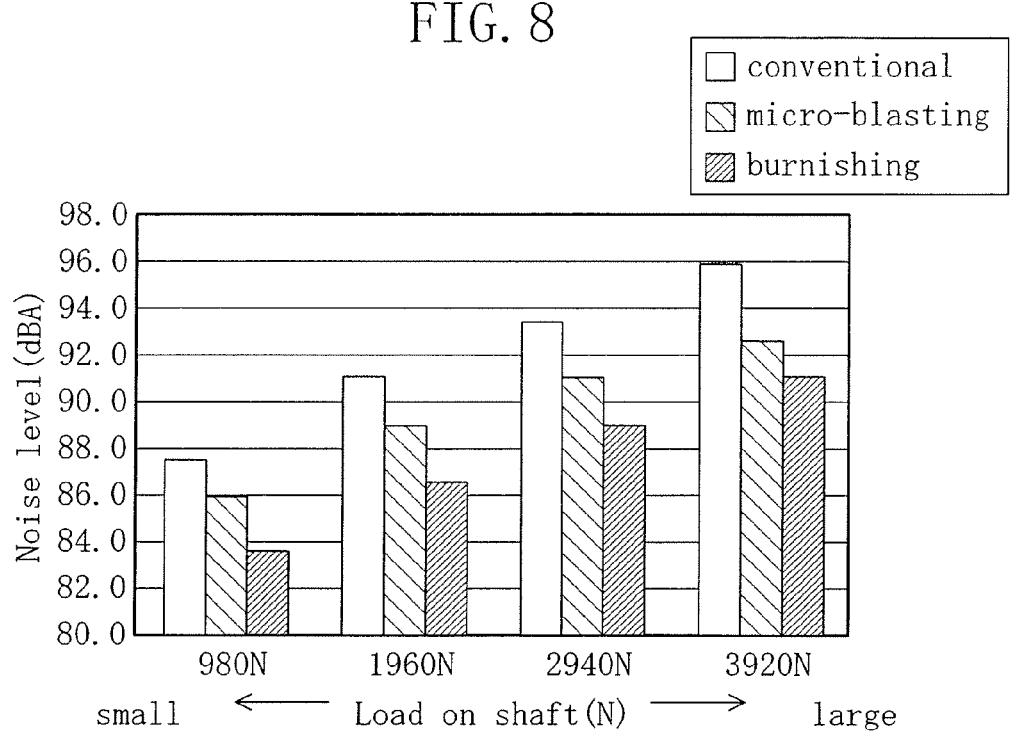
FIG. 8 is a graph showing noise measurement results (OVERALL values) on the groove surfaces finished in different ways.
Figure 9:
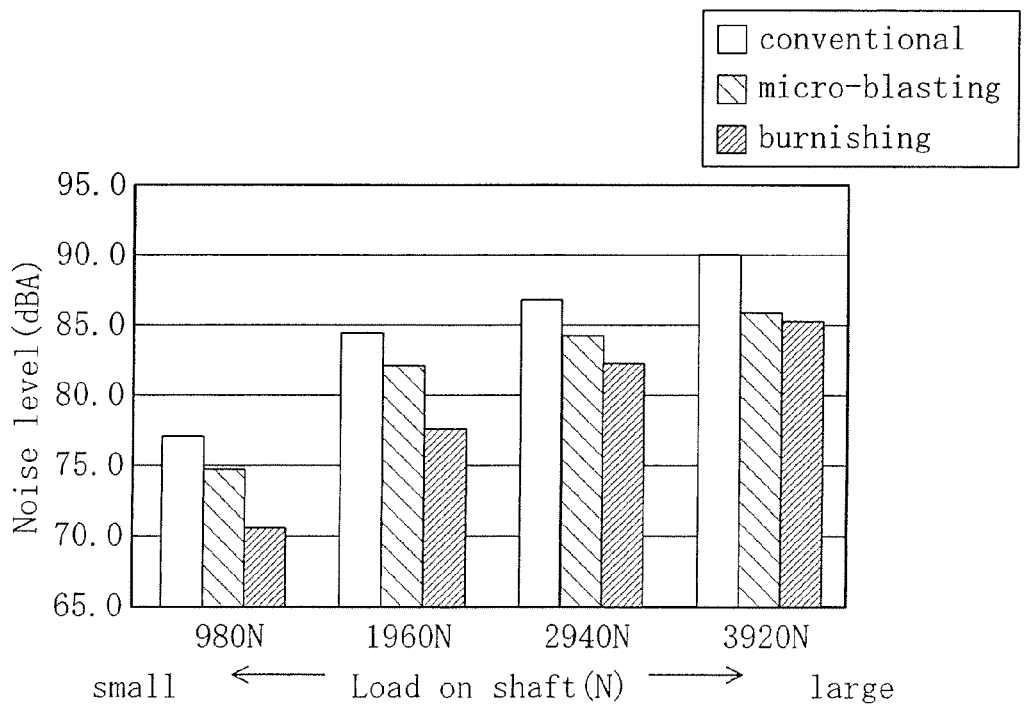
FIG. 9 is a graph showing noise measurement results (only frequency components corresponding to the block pitch of the V-belt) on the groove surfaces finished in different ways.

Furthermore, three types of belt drive systems were prepared in which the groove surfaces of the pulley grooves 15 and 16 were subjected to a conventional surface finishing (ground by an MC or a milling machine and subjected to plating, such as electroless nickel plating for anti-rust and anti-corrosion), micro-blasting and burnishing, respectively. Then, each belt drive system was measured with the microphone 18 in terms of noise level (unit: dBA) produced during operation when the set weight SW1 on the driven pulley 15 was set under four conditions, i.e., at 980N, 1960N, 2940N and 3920N, and the number of rotations of the drive pulley 16 was changed from 100 to 3000 rpm. The measurement results are shown in FIGS. 8 and 9. The load length rates tp of the groove surfaces of the pulleys 15 and 16 subjected to the conventional surface finishing, micro-blasting and burnishing were as shown in FIG. 6 and the arithmetic mean roughnesses Ra thereof were 0.296, 0.475 and 0.406 μm. The measurement of surface features, such as tp, was made using a contact type surface roughness meter (Model CS-411) manufactured by Shimadzu Corporation.

FIG. 8 shows noise levels (OVERALL values) on the belt groove surfaces of the drive pulleys 16 subjected to different finishings when the set weight SW1 on their driven pulleys 15 was changed. Consideration of the results shows that the belt groove surfaces subjected to micro-blasting and burnishing produced smaller noise than that subjected to the conventional surface finishing regardless of the magnitude of load from the V-belt 17.

FIG. 9 shows noise levels of the frequency component corresponding to the block pitch (3 mm) of the V-belt 17. FIG. 9 also shows that the belt groove surfaces subjected to the above-mentioned micro-blasting and burnishing reduced noise production than that subjected to the conventional surface finishing. Generally, dominant noise produced during travel of the V-belt 17 is noise produced by blocks forming part of the V-belt 17. Reference to FIG. 9 shows that such noise due to blocks can be largely reduced.

As seen from the above, when the groove surface of the pulley 16 was micro-blasted or burnished, i.e., when the groove surface was subjected to surface finishing so that its surface roughness can satisfy the above expression (1), noise during belt travel was able to be effectively reduced and the effectiveness of noise reduction was able to be verified.

—Verification of Durability—

Furthermore, a verification test was also carried out for verifying the durability of the belt drive systems in which the groove surfaces of their pulleys were subjected to the different types of surface finishings as described above.

Figure 10A:
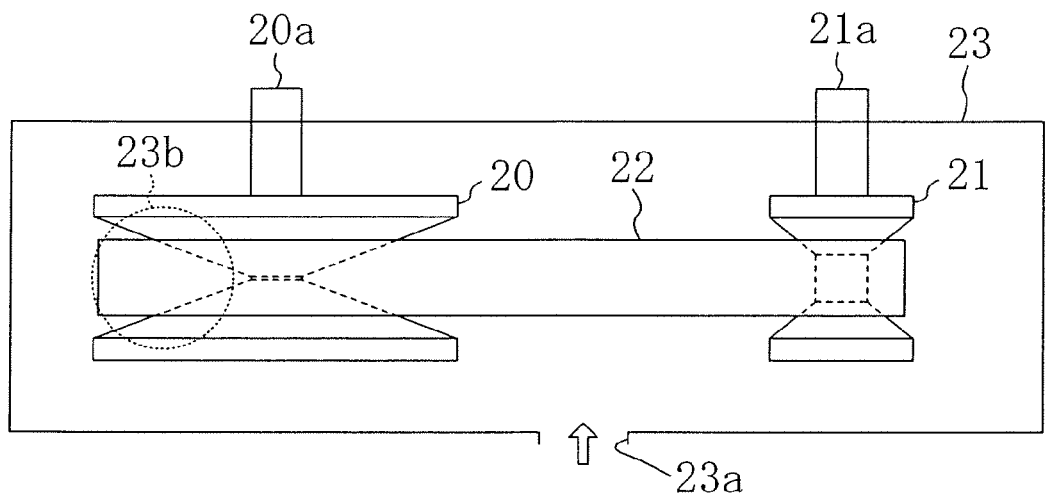
FIG. 10 shows a schematic structure of a durability tester, wherein 10A is a top view showing when the top plate of a case is removed and 10B is a front view showing when one of the side plates of the case is removed.

FIG. 10 schematically shows the durability tester used in this example. The durability tester shown in FIG. 10 includes a drive pulley 20 of 126.4 mm pitch diameter carried on a drive rotational shaft 20*a* and a driven pulley 21 of 70.8 mm pitch diameter carried on the driven rotational shaft 21*a*, both the pulleys 20 and 21 being placed at a specified center distance. Each belt drive system is covered with a heat-resisting case 23. The case 23 is formed with a feed port 23*a* through which hot wind is fed into the case 23 and a discharge port 23*b* through which the hot wind is discharged to the outside of the case 23. Thus, the belt drive systems can be examined in terms of durability under high-temperature conditions.

Figure 10B:
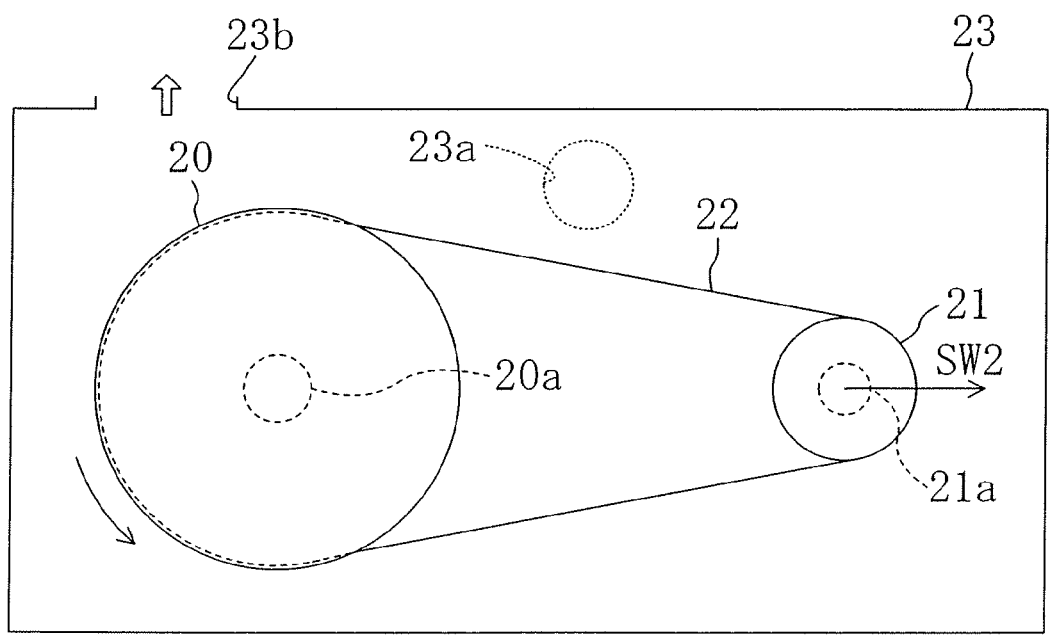

A heavy-duty drive V-belt 22 as described above (see FIG. 4) is wrapped between both the pulleys 20 and 21 and both the pulleys 20 and 21 are configured to be rotated at a high speed (5285+60 rpm) with a set weight SW2 (1764±49 N) applied on the driven pulley 21 in the direction of arrow in FIG. 10B. The other specific test conditions are shown in FIG. 11.

According to the above durability test, it was able to be verified that the working examples of the belt drive system according to the present invention produced no damage to the V-belt 22 until 500 hours after start of belt travel and therefore had a satisfactory durability.

The invention claimed is:

1. A belt drive system including: a drive V-belt having a large number of blocks engagingly fixed in mating relation to a pair of tension members; and a V-pulley formed with a groove for wrapping the V-belt therearound, the belt drive system being configured to transmit power by contact of side faces of the V-belt with the surface of the groove in the V-pulley, wherein the surface of the groove in the V-pulley is configured so that the following relational expression holds between tp and y of a roughness curve indicating the surface features of the surface of the groove in the V-pulley $$y \leq -0.9 \times tp + 100$$

where tp is the load length rate, which is a function of both the heights and widths of microscopic hills on the surface of the groove of the V-pulley and is a percent rate of load applied per length to the surface of the groove of the V-pulley at a given position of the roughness curve in a direction of height and y is the degree of height indicated by a percentage of the ratio of the height from a lowest valley on the surface of the groove of the V-pulley having a maximum depth to the given position to a hill maximum height Ry, where tp is greater than 20% and less than 100%.

2. The belt drive system of claim 1, wherein the surface of the groove in the V-pulley is blasted with abrasive grains having a diameter of approximately 3 μm to approximately 40 μm.

3. The belt drive system of claim 1, wherein the surface of the groove in the V-pulley is burnished with a tool whose tip is formed to have a curvature radius of approximately 1.5 mm to approximately 3.0 mm.

\* \* \* \* \*